No. 793,056. PATENTED JUNE 27, 1905.
H. H. CLOUGH.
MOLD FOR CONCRETE CURBING.
APPLICATION FILED MAR. 14, 1904.

7 SHEETS—SHEET 1.

Witnesses:
J. B. Weir
Oliver L. Plumtree

Inventor:
Henry H. Clough

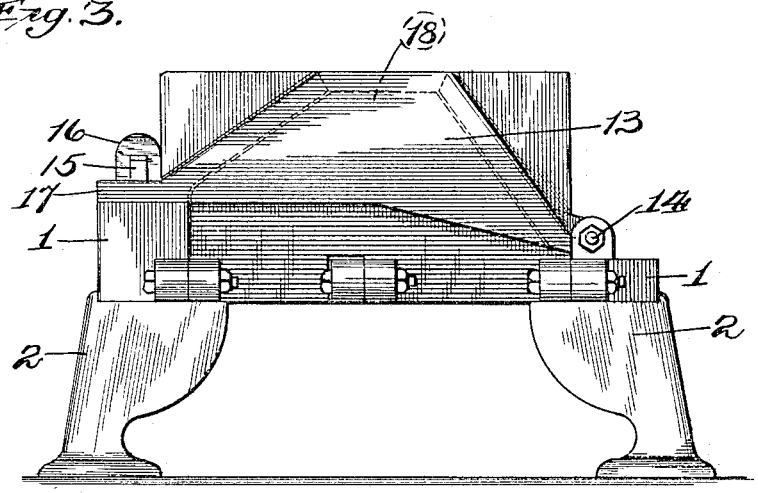
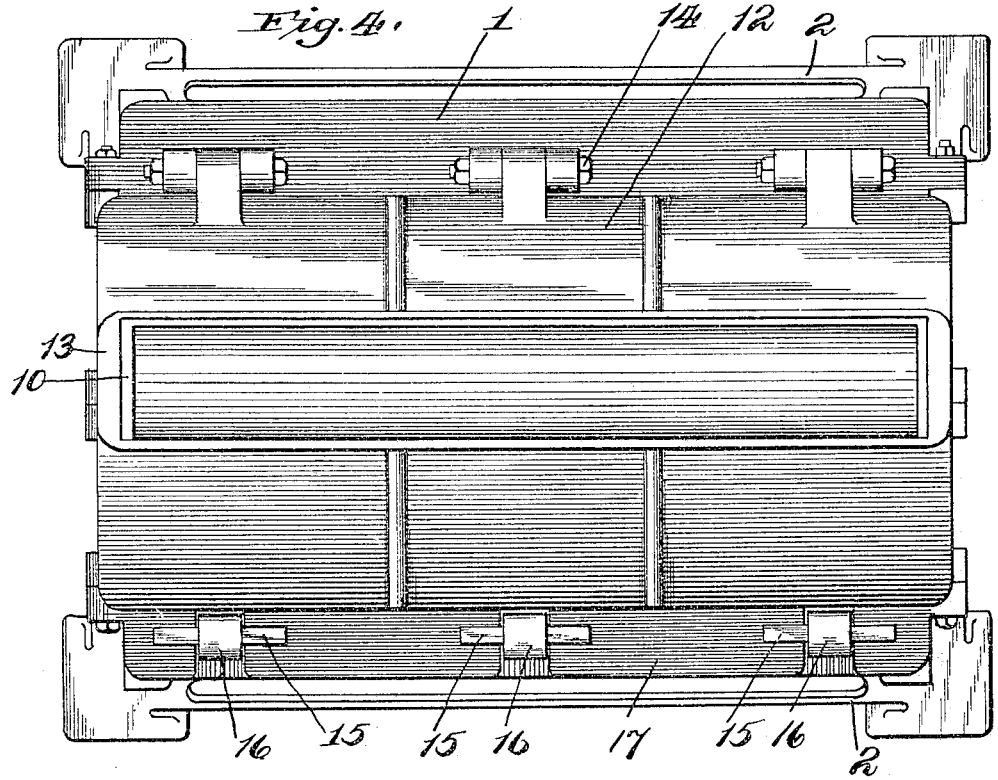

No. 793,056. PATENTED JUNE 27, 1905.
H. H. CLOUGH.
MOLD FOR CONCRETE CURBING.
APPLICATION FILED MAR. 14, 1904.

7 SHEETS—SHEET 3.

Witnesses:
J. B. Weir
Aaron L. Plumtree

Inventor:
Henry H. Clough

No. 793,056. PATENTED JUNE 27, 1905.
H. H. CLOUGH.
MOLD FOR CONCRETE CURBING.
APPLICATION FILED MAR. 14, 1904.

7 SHEETS—SHEET 5.

Witnesses:
J B Weir
Oliver L Plumtre

Inventor:
Henry H. Clough

No. 793,056. PATENTED JUNE 27, 1905.
H. H. CLOUGH.
MOLD FOR CONCRETE CURBING.
APPLICATION FILED MAR. 14, 1904.

7 SHEETS—SHEET 6.

Witnesses:
J. B. Weir
Oliver L. Plumtree

Inventor:
Henry H. Clough

No. 793,056. PATENTED JUNE 27, 1905.
H. H. CLOUGH.
MOLD FOR CONCRETE CURBING.
APPLICATION FILED MAR. 14, 1904.

7 SHEETS—SHEET 7.

Witnesses:
J. B. Weir
Oliver L. Plumtre

Inventor:
Henry H. Clough

No. 793,056. Patented June 27, 1905.

UNITED STATES PATENT OFFICE.

HENRY H. CLOUGH, OF ELYRIA, OHIO.

MOLD FOR CONCRETE CURBING.

SPECIFICATION forming part of Letters Patent No. 793,056, dated June 27, 1905.

Application filed March 14, 1904. Serial No. 197,969.

*To all whom it may concern:*

Be it known that I, HENRY H. CLOUGH, a citizen of the United States, and a resident of Elyria, Lorain county, Ohio, have invented certain new and useful Improvements in Molds for Concrete Curbing, of which the following is a complete specification.

This invention relates to molds for making concrete articles, and relates particularly to molds the bottoms of which are removable with the contents thereof and which form a support for the contents of said mold in removing the same of the general type described and claimed in an application for United States Letters Patent filed by me in the Patent Office concurrently herewith, Serial No. 197,968.

A primary object of the invention is to provide a mold of this type for making concrete articles of irregular shape, such as concrete curbing and the like, which may be readily opened to provide for removing the contents of the mold, together with the bottom thereof, upon which the contents of the mold is supported, and closed to prepare the mold for making another article.

A mold of my invention consists of the various features, combinations of features, and details of construction hereinafter described and claimed.

Figure 1:
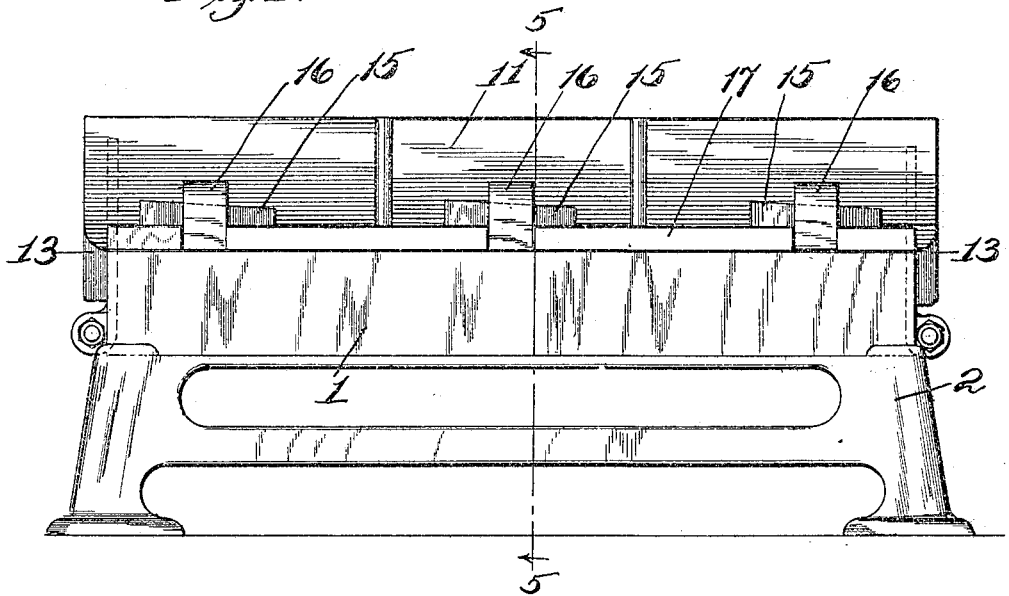
Figure 2:
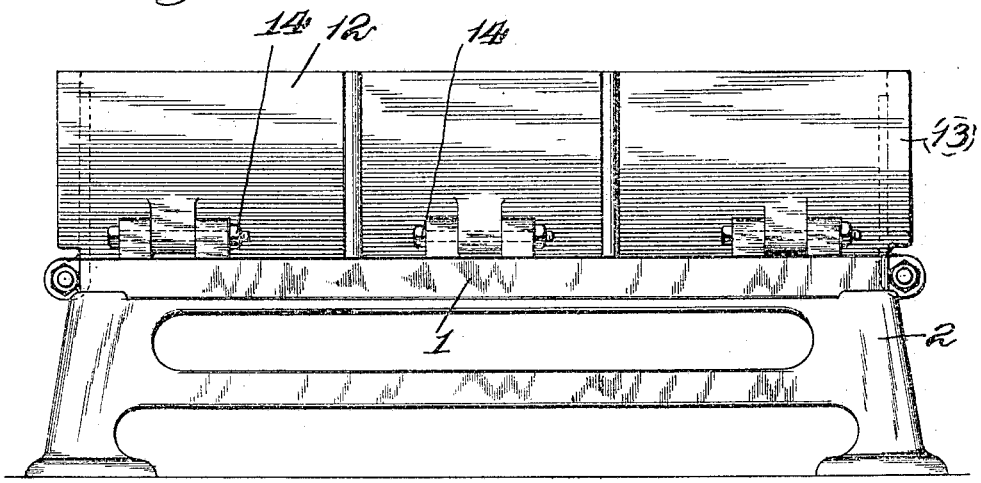
Figure 5:
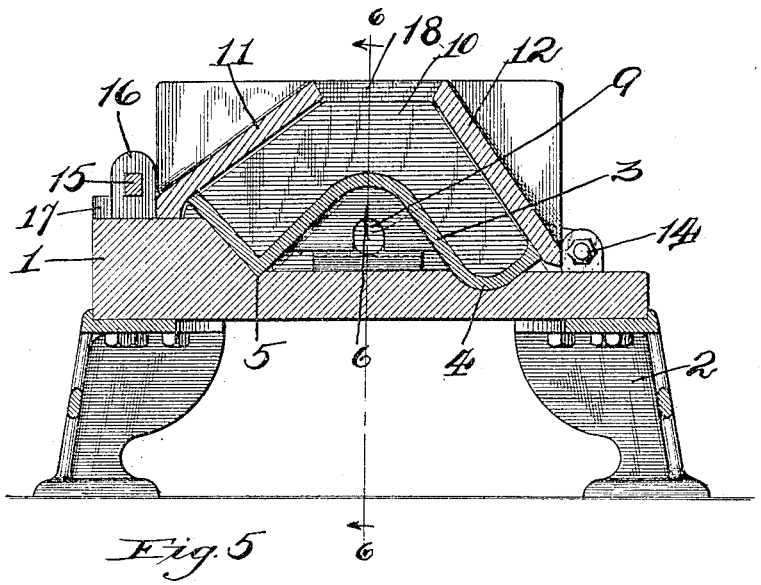
Figure 6:
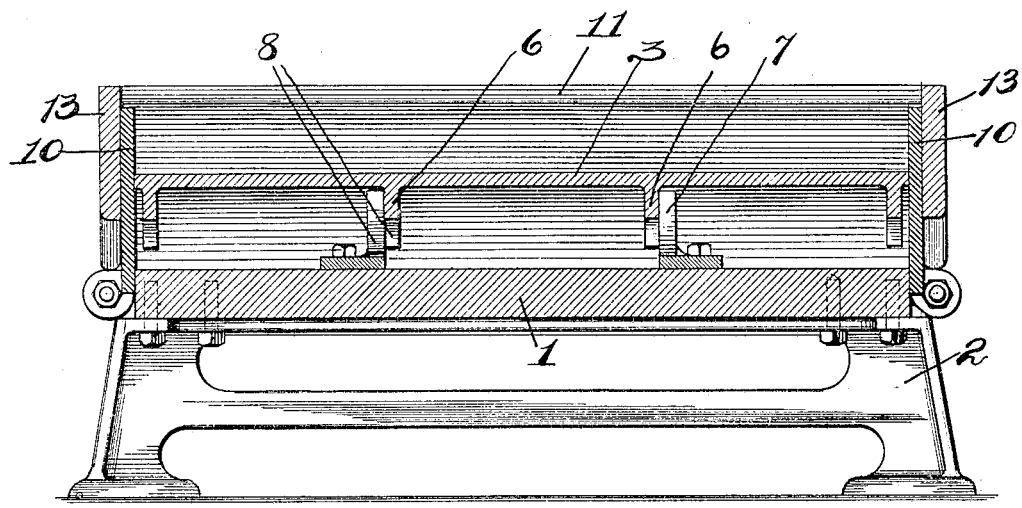
Figure 7:
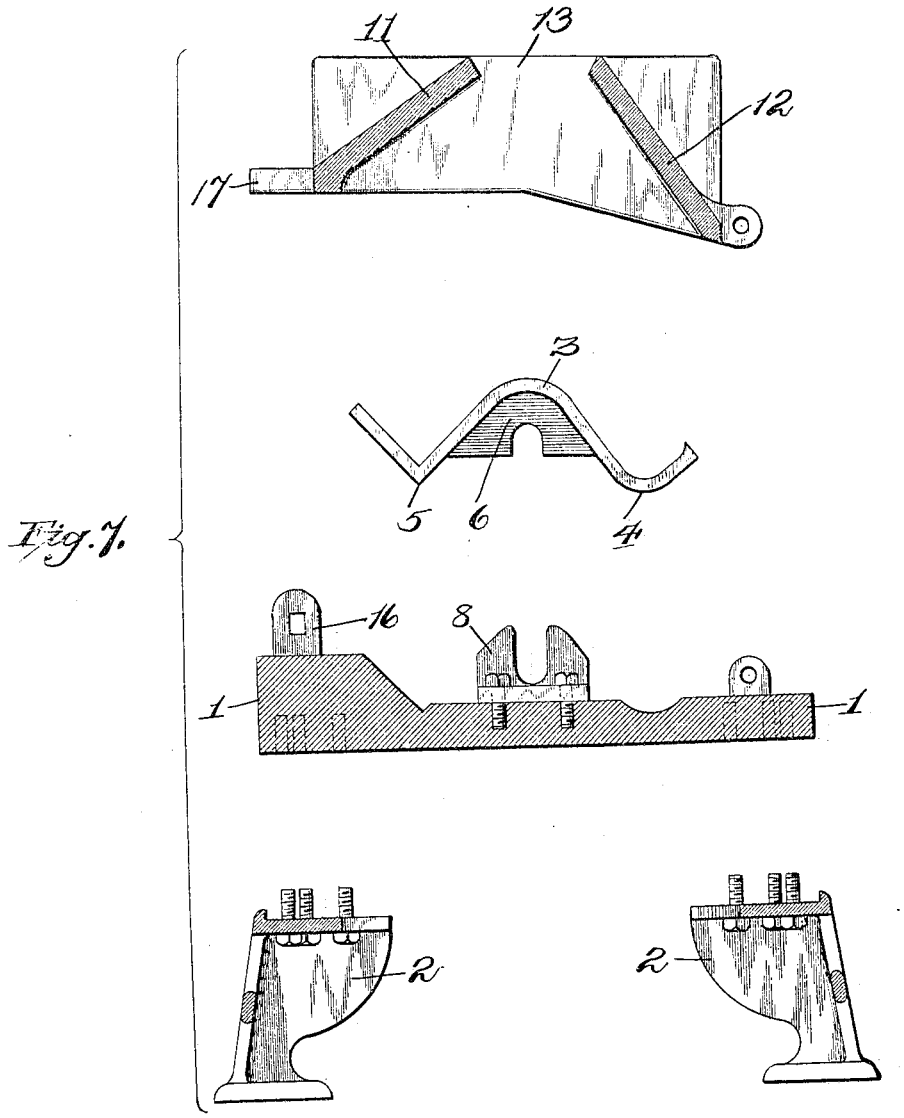
Figure 8:
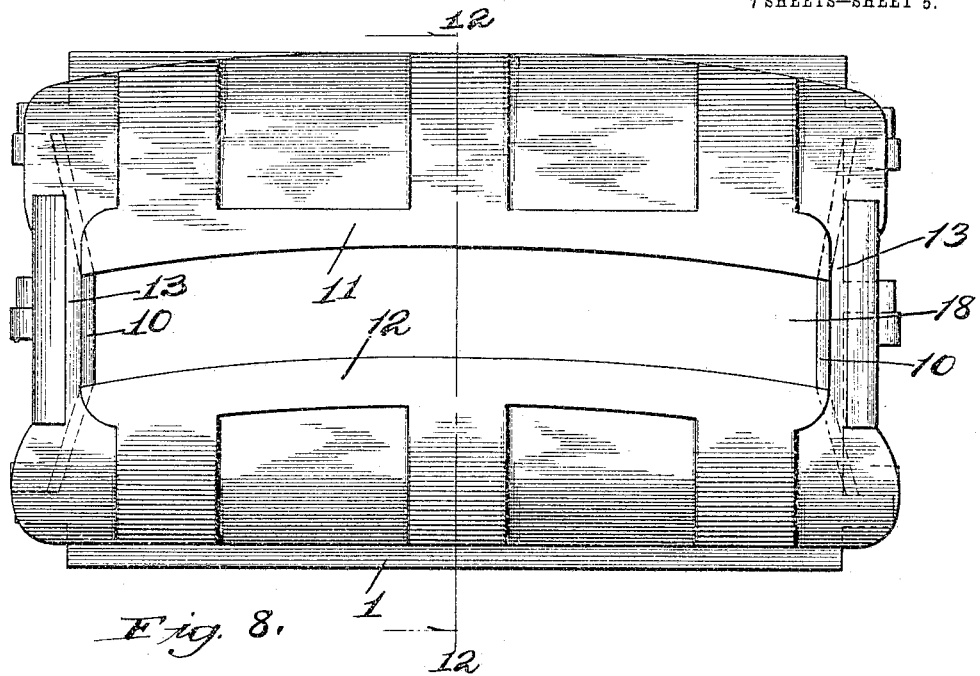
Figure 9:
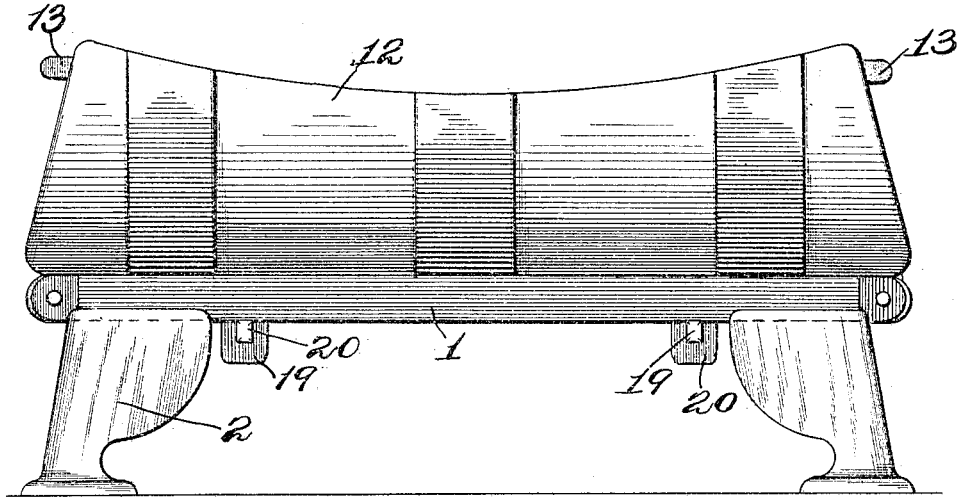
Figure 10:
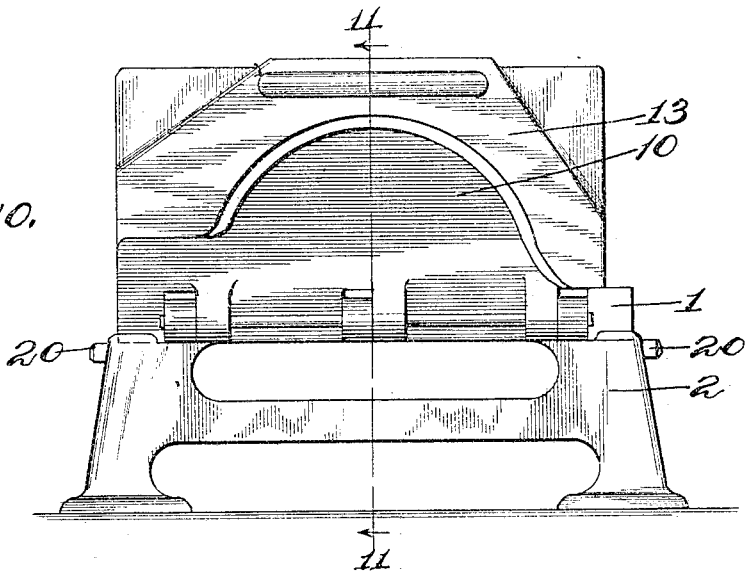
Figure 13:
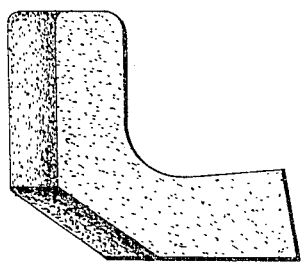
Figure 14:
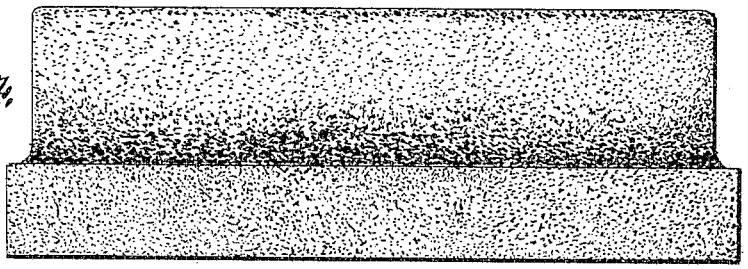
Figure 11:
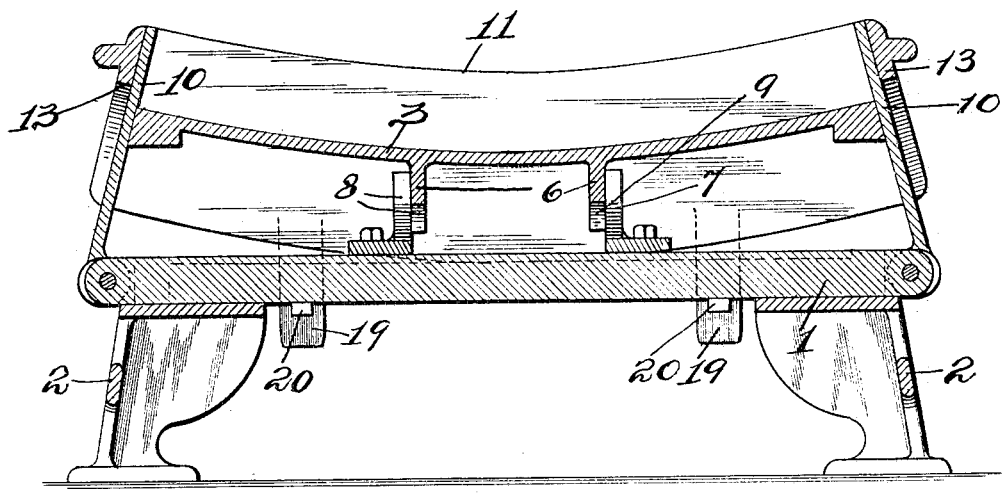
Figure 12:
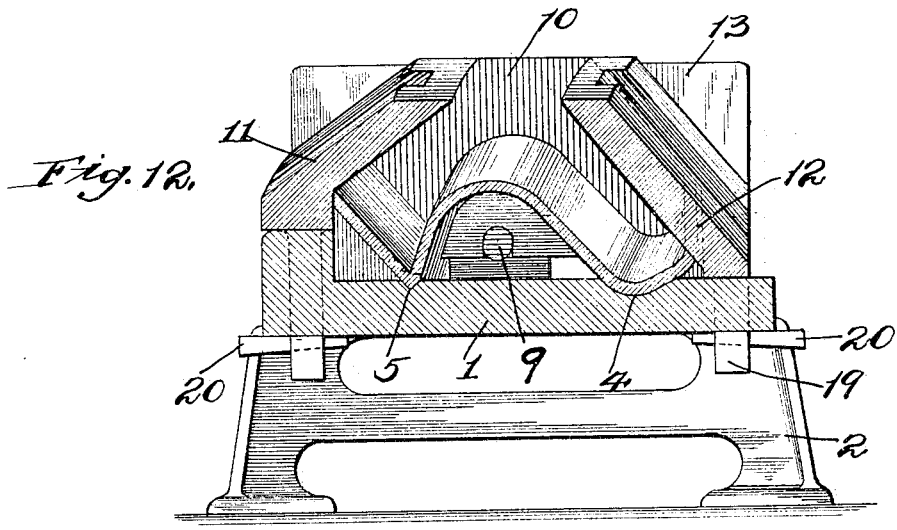

Figures 1 and 2 are elevations of opposite sides of a mold of my invention. Fig. 3 is an end view thereof. Fig. 4 is a top plan view thereof. Fig. 5 is a transverse sectional elevation on the line 5 5 of Fig. 1. Fig. 6 is a longitudinal sectional elevation on the line 6 6 of Fig. 5. Fig. 7 is a view of the parts shown in Fig. 5 in disconnected position. Fig. 8 is a top plan view of a modified form of mold of my invention. Fig. 9 is a side view thereof. Fig. 10 is an end view thereof. Fig. 11 is a longitudinal sectional elevation thereof on the line 11 11 of Fig. 10. Fig. 12 is a transverse sectional elevation on the line 12 12 of Fig. 8; and Figs. 13 and 14 are end and front views, respectively, of a section of curbing such as the mold shown in Figs. 8 to 12, inclusive, is adapted for making.

The mold illustrated in the drawings is adapted for making concrete curbing.

The elements of the mold proper are supported upon a suitable frame comprising a bed-plate 1, which is supported upon legs 2.

The removable bottom of the mold consists of a plate 3, the exposed surface of which conforms to the face or front of the finished curbing. As shown also, the exterior surface of said plate 3 conforms substantially to the inner surface thereof, the opposite sides of said plate being thus substantially parallel with each other.

The position of the removable bottom 3 upon the bed-plate is defined by means of suitable recesses in said bed-plate, which are adapted to receive corresponding portions of said mold-bottom. As shown, said bed-plate 1 is provided with recesses or grooves 4 and 5, the groove or recess 4 being rounded and the groove or recess 5 being angular to receive correspondingly-shaped surfaces on the exterior surface of the mold-bottom 3.

The position of the mold-bottom 3 lengthwise of the machine is defined by suitable engaging guide-surfaces on said mold-bottom 3 and the bed-plate 1. As shown, webs 6 are formed on the exterior surface of the mold-bottom 3, of which the two central webs are adapted to be inserted between brackets 7, secured to the bed-plate 1, the relation being such that when said webs 6 are in engagement with the brackets 7 they will define the proper longitudinal position of the mold-bottom 3 on the bed-plate 1. As shown, slots 8 are formed in the webs 6 and brackets 7, the slots in the webs extending upwardly from the lower edges thereof and the slots in the brackets 7 extending downwardly from the upper edges thereof and their relation being such that when the mold is assembled the slots 8 in said webs 6 and brackets 7 will form an opening 9, Fig. 5, through which a rod or bar may be inserted beneath the mold-bottom 3 to provide means for conveniently raising and removing the same.

The ends of the mold are formed by walls 10, which are preferably hinged or articulated to the bed-plate 1 so that they can be conveniently turned into position to close the ends of the mold or swung outwardly to expose the same.

The lateral sides of the mold are formed by inclined walls 11 and 12 so located relatively to each other as to give the rear surface of the curbing a desired shape. As shown, the inner surfaces of said walls 11 and 12 extend substantially at right angles to each other. In the preferable construction shown the side walls 11 and 12 are connected by what for purposes of convenient reference may be termed "cheek-plates" 13, being preferably formed integral therewith, which operate to maintain said side walls 11 and 12 in proper relative positions. Preferably also said cheek-plates 13 are designed and adapted to closely embrace the outer surfaces of the end walls 10 when the mold is closed, as clearly shown in Figs. 5 and 6 of the drawings, thus providing convenient means for securing said end walls in closed position.

In order to open the mold to provide for removing the bottom 3 with the contents of the mold, the plates 11 and 12 are supported in such manner that they may be removed. As shown, the structure formed by the side walls 11 and 12 and the cheek-plates 13 is hinged to the bed-plate 1 at the base of the side wall 12, as shown at 14, and is adapted to be detachably secured to said bed-plate at its opposite side by suitable means, as by wedges 15 inserted through openings in lugs or projections 16, formed on said bed-plate directly above rigid lateral extensions 17 of the side wall 11.

When closed, the mold is adapted to be filled through an opening 18 between the upper edges of the side walls 11 and 12. The removable bottom 3 of the mold affords a support for the contents of the mold in removing the same, whereby it is possible to remove the contents of said mold as soon as the concrete is set and before it has hardened. Also by providing a number of mold-bottoms it is obvious that said mold may be used continuously without waiting for the contents thereof to harden, all as fully explained in said application for Letters Patent, Serial No. 197,968, above referred to.

In Figs. 8 to 12, inclusive, I have shown a modified form of mold embodying my invention, the modification consisting of the means for securing the side walls 11 and 12 to the bed-plate 1. Instead of being hinged to the bed-plate, as in the form of mold shown in Figs. 1 to 7, inclusive, said plates are provided with projections 19 on their lower edges which are adapted to be inserted through corresponding holes or openings in the bed-plate 1, and said side walls are adapted to be secured firmly in position by means of wedges 20, inserted through transverse holes or openings in said projections beneath the bed-plate 1. When it is desired to remove the side walls 11 and 12 to open the mold, the wedges 20 are driven out and the structure, consisting of the side walls 11 and 12 and cheek-plates 13, raised and removed bodily.

The mold shown in Figs. 1 to 7, inclusive, is adapted for making straight curbing, while that shown in Figs. 8 to 12, inclusive, is adapted for making curved curbing for use on corners and the like. In Figs. 13 and 14 I have shown a section of curbing of the kind the mold shown in Figs. 8 to 12 is adapted to make.

I claim as my invention—

1. A mold comprising a removable bottom and knockdown side and end walls to provide for opening the mold to remove the contents thereof together with the mold-bottom as a support therefor, the side walls being connected by cheek-plates designed to embrace the end walls of the mold when the mold is closed, substantially as described.

2. A mold comprising a bed-plate, a mold-bottom removably supported thereon, said bed-plate and mold-bottom being provided with suitable guides to define the position of said mold-bottom, side and end walls hinged to said bed-plate and means to secure said side and end walls in closed position, said mold being provided with an opening between the bed-plate and mold-bottom for the insertion of a rod or bar for removing said mold-bottom, substantially as described.

3. A mold comprising a bed-plate, a mold-bottom removably supported thereon, end walls hinged to said bed-plate, side walls, cheek-plates which connect said side walls and are designed and adapted to embrace the end walls of the mold when in closed position, one of said side walls being hinged to the bed-plate and means to detachably secure the other side wall to said bed-plate, substantially as described.

4. A mold comprising a bed-plate, a mold-bottom removably supported thereon, said bed-plate and mold-bottom being provided with coöperating guides to define the position of said mold-bottom, end walls hinged to said bed-plate, side walls, cheek-plates which connect said side walls and are designed and adapted to embrace the end walls of the mold when in closed position, one of said side walls being hinged to the bed-plate and means to detachably secure the other side wall to said bed-plate, substantially as described.

5. A mold comprising a bed-plate, a mold-bottom removably supported thereon, said bed-plate and mold-bottom being provided with interlocking guide-surfaces to define the position of said mold-bottom, end walls hinged to said bed-plate, side walls, cheek-plates which connect said side walls and are designed and adapted to embrace the end walls of the mold when in closed position, one of said side walls being hinged to the bed-plate and means to detachably secure the other side wall to said bed-plate, said mold being provided with an opening beneath the mold-bottom for the insertion of a rod or bar for removing said mold-bottom, substantially as described.

In testimony that I claim the foregoing as my invention I affix my signature, in presence of two subscribing witnesses, this 10th day of February, A. D. 1904.

H. H. CLOUGH.

Witnesses:
 HENRY W. CARTER,
 K. A. COSTELLO.